(12) United States Patent
Yamazaki et al.

(10) Patent No.: US 6,922,607 B2
(45) Date of Patent: Jul. 26, 2005

(54) NUMERICALLY CONTROLLED METHOD

(75) Inventors: Tsunehiko Yamazaki, 2443, Ometeyama 3-chome, Teripaku-ku, Nagoya-shi, Aichi-ken (JP); Kohei Ohnishi, Aichi-ken (JP); Naoomi Miyagawa, Gifu-ken (JP); Toshihiko Inoue, Aichi-ken (JP)

(73) Assignee: Tsunehiko Yamazaki, Aichi-ken (JP)

( * ) Notice: Subject to any disclaimer, the term of this patent is extended or adjusted under 35 U.S.C. 154(b) by 0 days.

(21) Appl. No.: 10/995,625

(22) Filed: Nov. 23, 2004

(65) Prior Publication Data

US 2005/0071020 A1 Mar. 31, 2005

Related U.S. Application Data

(63) Continuation-in-part of application No. 10/004,640, filed on Dec. 5, 2001.

(30) Foreign Application Priority Data

Dec. 6, 2000 (JP) ....................................... 2000-371386

(51) Int. Cl.$^7$ ............................................... G06F 19/00
(52) U.S. Cl. ...................... 700/188; 700/186; 700/187; 700/189
(58) Field of Search ..................... 700/61, 63, 187–189

(56) References Cited

U.S. PATENT DOCUMENTS

| | | | | |
|---|---|---|---|---|
| 5,028,855 A | * | 7/1991 | Distler et al. ................ | 700/187 |
| 5,229,698 A | * | 7/1993 | Minnich et al. ........ | 318/568.15 |
| 5,321,623 A | * | 6/1994 | Ensenat et al. ............. | 700/189 |
| 5,369,592 A | * | 11/1994 | Honda ......................... | 700/187 |
| 5,614,800 A | * | 3/1997 | Nakano et al. ........ | 318/568.18 |
| 5,615,319 A | * | 3/1997 | Metzger et al. ............. | 345/427 |
| 5,659,480 A | * | 8/1997 | Anderson et al. ........... | 700/186 |
| 5,682,319 A | * | 10/1997 | Boland et al. .............. | 700/189 |
| 5,708,586 A | * | 1/1998 | Ikeda ......................... | 700/186 |
| 5,808,596 A | * | 9/1998 | Kim ............................ | 345/98 |
| 5,808,893 A | * | 9/1998 | Pugh et al. ................. | 700/193 |
| 5,825,654 A | * | 10/1998 | Speth et al. ................ | 700/188 |
| 5,926,389 A | * | 7/1999 | Trounson .................... | 700/187 |
| 5,936,864 A | * | 8/1999 | Otsuki et al. ............... | 700/188 |
| 6,401,006 B1 | * | 6/2002 | Mizuno et al. ............. | 700/189 |
| 6,782,306 B2 | * | 8/2004 | Yutkowitz ................... | 700/189 |

* cited by examiner

Primary Examiner—John Follansbee
Assistant Examiner—Aaron C Perez-Daple
(74) Attorney, Agent, or Firm—Duane Morris LLP

(57) ABSTRACT

In a numerically controlled method of moving an object to be controlled along a predetermined locus, controlling control axes, the locus is made approximate to a spatial polynomial, a polynomial is converted into a polynomial as time function, the polynomial converted as time function is distributed to each control axis, control command in each control axis is produced on the basis of the polynomial distributed to each axis as time function, and the object to be controlled is moved along the locus, controlling each control axis on the basis of the control command. The velocity, the acceleration and the jerk of the object to be controlled can be easily obtained concerning each control axis in advance by differentiating the polynomial expressed by time function. The object to be controlled is controlled so as to move along the locus expressed by the polynomial, feeding irregularity or position shift is reduced and curved face machining at high accuracy is possible.

13 Claims, 8 Drawing Sheets

Fig.3
(a)
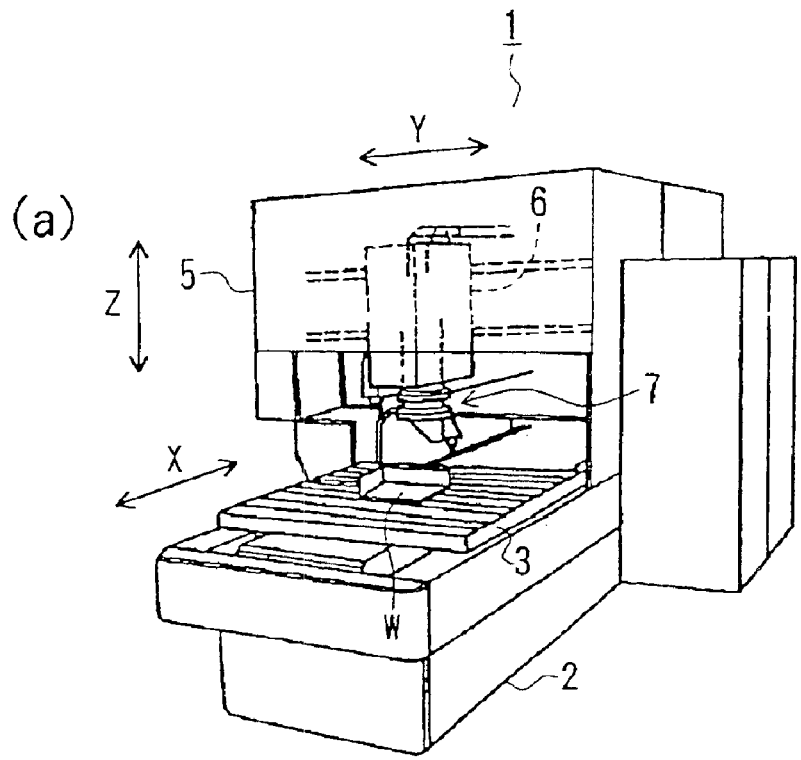
(b)
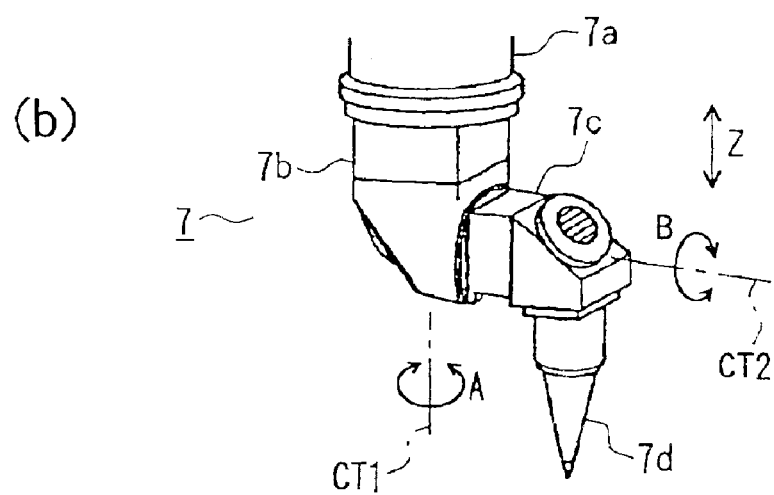

Fig.5

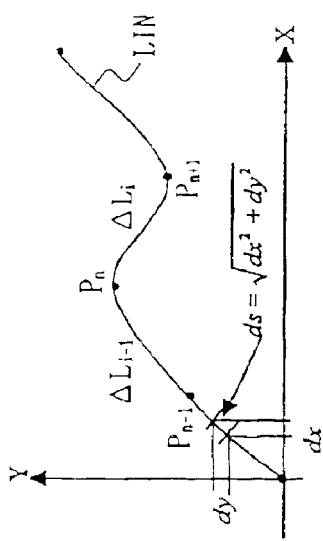

IF LEFT DRAWING IS CURVED LINE DEFINED BY FOLLOWING POLYNOMIAL.

$$y = f(\lambda) = A\lambda^3 + B\lambda^2 + C\lambda + D \quad \cdots\cdots (B1)$$
$$x = g(\lambda) \quad \cdots\cdots (B2)$$

IF $0 \leq \lambda \leq 1$

IF WHOLE LENGTH OF CURVED LINE DEFINED IS L, FOLLOWING EXPRESSION CAN BE COMPUTED $$L = \int_0^1 ds = \int_0^1 \sqrt{dx^2 + dy^2} = \int_0^1 \sqrt{\left(\frac{dx}{d\lambda}\right)^2 + \left(\frac{dy}{d\lambda}\right)^2} \cdot d\lambda \quad \cdots\cdots (B3)$$

FURTHERMORE, FOLLOWING LINE ELEMENT IS DEFINED BY CUTTING PARAMETER $\lambda$ WITH SEQUENCE $0 = \lambda_0 < \lambda_1, \lambda_2, \cdots, \lambda_i, \cdots < \lambda_m = 1$ $$\Delta L_i = \int_0^{\lambda_i} \sqrt{\left(\frac{dx}{d\lambda}\right)^2 + \left(\frac{dy}{d\lambda}\right)^2} \cdot d\lambda \quad \cdots\cdots (B4)$$

GIVE VELOCITY PROFILE OF VELOCITY FUNCTION $F(t)$ HAVING TIME PARAMETER ON THIS CORVED LINE AND OBTAIN FOLLOWING EXPRESSION $$\Delta L_i = \int_0^{t_i} F(t) \cdot dt \quad \cdots\cdots (B5)$$

$\lambda$ AND $t$ CAN BE RELATED WITH EACH OTHER BY MAKING LENGTH OF THIS LINE SEGMENT EQUAL TO LENGTH OF LINE SEGMENT (1)

$$\Delta L_i = \int_0^{\lambda_i} \sqrt{\left(\frac{dx}{d\lambda}\right)^2 + \left(\frac{dy}{d\lambda}\right)^2} \cdot d\lambda = \int_0^{t_i} F(t) \cdot dt \quad (37)$$

BY SOLVING THIS, FOLLOWING IS COMPUTED $$\lambda = \alpha(t) \quad \cdots\cdots (B6)$$

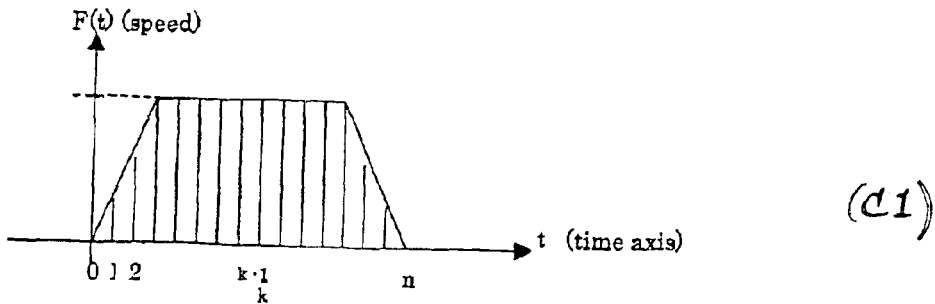

$$l_k = \sum_{i=1}^{k} F(i) \qquad (C2)$$

$$l_k = \int_0^{\lambda_k} \sqrt{\left(\frac{dx}{d\lambda}\right)^2 + \left(\frac{dy}{d\lambda}\right)^2} \cdot d\lambda \qquad (C3)$$

$$l_1 = \sqrt{\begin{array}{l}((A_x\lambda_1^3 + B_x\lambda_1^2 + C_x\lambda_1 + D_x) - (A_x\lambda_0^3 + Bx\lambda_0^2 + C_x\lambda_0 + D_x))^2 \\ + ((A_y\lambda_1^3 + B_y\lambda_1^2 + C_y\lambda_1 + D_y) - (A_y\lambda_0^3 + B_y\lambda_0^2 + C_x\lambda_0 + D_y))^2\end{array}} \qquad (C4)$$

$$l_1 = \sqrt{((A_x\lambda_1^3 + B_x\lambda_1^2 + C_x\lambda_1)^2 + ((A_y\lambda_1^3 + B_y\lambda_1^2 + C_y\lambda_1)^2} \qquad (C5)$$

$$l_1 = \sqrt{((C_x\lambda_1)^2 + (C_y\lambda_1)^2} = \sqrt{(C_x^2 + C_y^2)\lambda_1^2} \qquad (C6)$$

$$\lambda_1 = \sqrt{\frac{l_1^2}{C_x^2 + C_y^2}} \qquad (C7) \qquad \lambda_k = \sqrt{\frac{(l_k - l_{k-1})^2}{C_x^2 + C_y^2}} + \lambda_{k-1} \qquad (C8)$$

NUMERICALLY CONTROLLED METHOD

CROSS REFERENCE TO RELATED APPLICATION

This is a continuation-in-part of co-pending U.S. non-provisional application Ser. No. 10/004,640, filed Dec. 5, 2001, which claims priority to Japanese national patent application serial 2000-371386, filed Dec. 6, 2000; the entirety of which applications are incorporated herein by reference.

FIELD OF INVENTION

This invention relates to a numerically controlled method capable of machining on curved face and the like at high accuracy.

BACKGROUND OF THE INVENTION

FIG. 7 shows a conventional servo control system. When servo control of each axis is performed using a three dimensional spatial position command, a conventional servo control system 60 (such as one used for a laser beam machine and a machining center) instructs an axis command producing portion 50 to produce a motion command for each control axis necessary to effect a spatial position command and velocity command instructed by a machining program.

The motion command for each axis is output to a corresponding axis control portion, and the axis control portion drives a motor on the basis of the motion command. At this time, feedback is gained regarding the position, velocity and acceleration of the motor at sampling increments so as to compute actual velocity and acceleration of the motor.

The difficulty in using such a method of determining velocity and acceleration through the use of feedback monitoring is that it introduces an element of delay into the control method, since, by the time the control parameter is computed, the machine has passed beyond the discrete point which the analysis is intended to model. Therefore, the motion of the machine in each axis is not controlled on the basis of the state of the motion at a specific instant in time, but on the basis of the state of the motion at some previous sampling time. As a result, when machining is executed at high speed, or when the tool is forced to negotiate a particularly severe curved section of a workpiece, substantial errors can result from this delay. Thus, the machining operation can be difficult to properly control and machining tolerance errors can result. In the servo control system 60 shown in FIG. 7, for instance, the spatial position command PC (which represents the path in three dimensional space along which the tool moves), and the velocity command VC, are transmitted to the individual axis command producing portion 50 (in this case, a velocity override command OC can also be given to the individual axis command producing portion 50). Upon receiving these commands PC, VC, the individual axis command producing portion 50 produces the position command Dn once every sampling increment "s" for each axis Sn (n=1, 2, . . . , 5) to be controlled.

An axis control portion 51 for each axis Sn produces the velocity command and the acceleration command (or power command) necessary for servo control from the position command Dn of the axis Sn, and executes servo control for the particular axis through a power control portion 56, which controls the electric power provided to a servo motor M for the axis. Sn. In this way, the position command Dn is translated into a new tool position by position loop 52, velocity control is performed by a velocity loop 53, and acceleration control is performed by an acceleration loop 55.

But, as previously noted, since the velocity command and the acceleration command are produced on the basis of the state of the control axis at a specific point in time in axis control portion 51 of each axis Sn, the control of velocity and acceleration has an inherent delay element in this conventional servo control 60. The influence of this delay element is even bigger when using spline interpolation (or circular arc interpolation). Therefore, the movement of the working point of the tool, which is the composite movement of each axis, is not smooth and will include irregularities.

Besides, when a nonlinear element is encountered, it is necessary to limit the system to prevent sudden changes in velocity and acceleration that are beyond the limits of the tool, or which will introduce unacceptable machining error into the workpiece. With the conventional method, in which the velocity command and the acceleration command are produced from the position command which itself is based on a sample taken at a particular sampling time, then adequate control may be impossible. This results in an increase in error between the actual position of the tool and the commanded position of the tool. As a result, feeding irregularity (which is integration of the acceleration and position shift which is the integration of the feeding irregularity) occurs.

The object of the present invention is to provide a numerically controlled method capable of reducing feeding irregularity or position shift and which allows execution of curved face machining with high accuracy, taking the above-mentioned considerations and concerns into consideration.

SUMMARY OF THE INVENTION

The invention is a numerically controlled method of moving an object to be controlled along a predetermined locus, controlling control axes, said method comprising: making said locus approximate to a spatial polynomial; converting said polynomial into a polynomial as time function; distributing said polynomial converted as time function to said each control axis; producing control command in said each control axis on the basis of said polynomial distributed to said each axis as time function; and moving said object to be controlled along said locus, controlling each control axis on the basis of said control command.

The velocity, the acceleration, the jerk of a top end of a torch (or a top end of a tool) can be easily obtained for each control axis without time delay by deriving the polynomial which has been converted into time function. Each control axis is driven and controlled on the basis of the control parameter, such as the velocity and the acceleration obtained in this way. Therefore, the preview control wherein future moving state of an object to be controlled is foresaw and control is executed so as to correspond with the foreseeing is possible. By doing so, it is possible to provide a numerically controlled method wherein the motion of the object to be controlled is correctly controlled along the locus expressed by the polynomial, feeding irregularity or position shift is reduced, and machining on curved face or the like can be executed at high accuracy.

The control command can be produced on the basis of a position command on the basis of said polynomial converted as time function, a velocity command obtained by first deriving said polynomial converted as time function, and an acceleration command obtained by second deriving said polynomial converted as time function.

Furthermore, the control command can be obtained by using the polynomial having third or higher degree than third, such as the jerk command obtained by third deriving the converted polynomial as the time function.

A numerically controlled method is disclosed wherein said control command is executed by computing a position and velocity at the time in future when said object to be controlled has not yet moved on the basis of said polynomial as time function and commanding.

The position command, velocity command and jerk command can be produced without time delay, preview control is possible. Even in case where velocity vector or acceleration vector is suddenly changed concerning each control axis as suddenly curved line, it is easy to deal with.

A numerically controlled method is also disclosed for moving an object to be controlled along a predetermined locus by controlling respective control axes in a joint space, the method comprising: approximating said locus by defining a spatial polynomial in a work space, said spatial polynomial having a parameter $\lambda$ ($0 \leq \lambda \leq 1$) that is not dependent on time; obtaining said parameter $\lambda$ as a function of said time parameter t supposing that a length $\Delta L_i$ of one of the line elements of a curved line defined by said spatial polynomial, said parameter $\lambda$ of which is 0 through $\lambda_i$, is equal to a movement distance of moving said object to be controlled within a time $\Delta t_i$ on the basis of a predetermined speed function F(t) having a parameter of time t, by dividing said parameter $\lambda$ by sequences of numbers $0=\lambda_0<\lambda_1<\lambda_2<\lambda_3<\ldots<\lambda_i<\ldots<\lambda_n=1$; producing said time parameter polynomial by entering $\lambda=\alpha(t)$ thus obtain into said spatial polynomial and converting said parameter $\lambda$ into said function of time parameter t; producing a position command, a velocity command and an acceleration command from said converted time parameter polynomial; converting and delivering said produced position command, said velocity command and said acceleration command to said respective control axes in said joint space; producing control commands for said respective control axes in said joint space from said position command, said velocity command, and said acceleration command on the basis of said time parameter polynomial, converted and distributed to said control axes in said joint space; and moving said object to be controlled along said locus, while controlling said respective control axes in said joint space on the basis of said control commands.

The control command can be produced partly on the basis of said position command on displacement at a given time from said time parameter polynomial, said velocity command obtained from a first derivative of said time parameter polynomial, and said acceleration command obtained from a second derivative of said time parameter polynomial.

The control command includes computing a position and velocity at a time in the future, wherein when said control command is executed, said object to be controlled has not yet moved on the basis of said time parameter polynomial, and instructing said position and said velocity.

The predetermined speed function F(t) can be selected to result in movement along substantially the entire predetermined locus at a substantially constant velocity.

A method is disclosed for controlling the movement of an object along a predetermined locus in space by controlling respective machine control axes, the method comprising: approximating said locus by defining a spatial polynomial in a work space, said spatial polynomial having a coefficient $\lambda$; obtaining said parameter $\lambda$ as a function of time t by assuming that a length $\Delta L_i$ of one of the line elements of a curved line defined by said spatial polynomial is equal to a movement distance of said object over a time $\Delta t_i$ on the basis of a predetermined speed function F(t), which is a function of time t, by dividing said parameter $\lambda$ by sequences of numbers $0=\lambda_0<\lambda_1<\lambda_2<\lambda_3<\ldots<\lambda_i<\ldots<\lambda_n=1$; converting the spatial polynomial into a time parameter polynomial by substituting $\lambda=\alpha(t)$ into said spatial polynomial and converting said parameter $\lambda$ into said function of time parameter t; producing a position command, a velocity command and an acceleration command from said time parameter polynomial; converting and delivering said produced position command, said velocity command and said acceleration command to said respective control axes in said joint space; producing control commands for said respective control axes from said position command, said velocity command, and said acceleration command on the basis of said time parameter polynomial; and moving said object to be controlled along said locus, while controlling said respective control axes in said space on the basis of said control commands.

The control command can be produced partly on the basis of said position command obtained from said time parameter polynomial at a given time, said velocity command can be obtained from a first derivative of said time parameter polynomial, and said acceleration command can be obtained from a second derivative of said time parameter polynomial.

The control command can include computing a position and velocity at a desired time in the future. When the control command is executed, the object to be controlled has not yet moved on the basis of said time parameter polynomial. Further, the step of moving said object to be controlled along said locus can comprise moving the object at a substantially constant speed.

A method for controlling the movement of an object in space is also provided, comprising: defining a predetermined locus in space for movement of the object; approximating said locus by defining a spatial polynomial in a work space, said spatial polynomial having a coefficient $\lambda$; relating the coefficient $\lambda$ to time by assuming that a length $\Delta L_i$ of one of the line elements of a curved line defined by said spatial polynomial is equal to a movement distance of said object over a time $\Delta t_i$, on the basis of a predetermined speed function F(t) which is a function of time t, by dividing said parameter $\lambda$ by sequences of numbers $0=\lambda_0<\lambda_1<\lambda_2<\lambda_3<\ldots<\lambda_i<\ldots<\lambda_n=1$; converting the spatial polynomial into a time parameter polynomial by substituting $\lambda=\alpha(t)$ into said spatial polynomial and substituting said parameter $\lambda$ into said function of time parameter t; providing at least one of a position command, a velocity command and an acceleration command to said respective control axes in said joint space; and moving said object to be controlled along said locus on the basis of said control commands.

The speed function can be selected to produce a velocity command that moves the object along a substantial portion of the locus at a substantially constant velocity. Further, the speed function can be related to three mutually orthogonal axes to provide said substantially constant velocity in said working space. Additionally, the method can also comprise the further step of controlling said position command, said velocity command and said acceleration command to limit the movement of the object to predetermined maximum values of acceleration and jerk.

BRIEF DESCRIPTION OF THE DRAWINGS

FIGS. 3(a) and 3(b) are a perspective and partial perspective views, respectively, of the exterior of the laser beam machine in the present embodiment;

FIG. 5 shows the process steps for producing a command for each control axis representing a curved line in a two dimensional plane;

FIG. 8 shows a the process steps for relating the control polynomial to time.

DETAILED DESCRIPTION OF THE INVENTION

Figure 1:
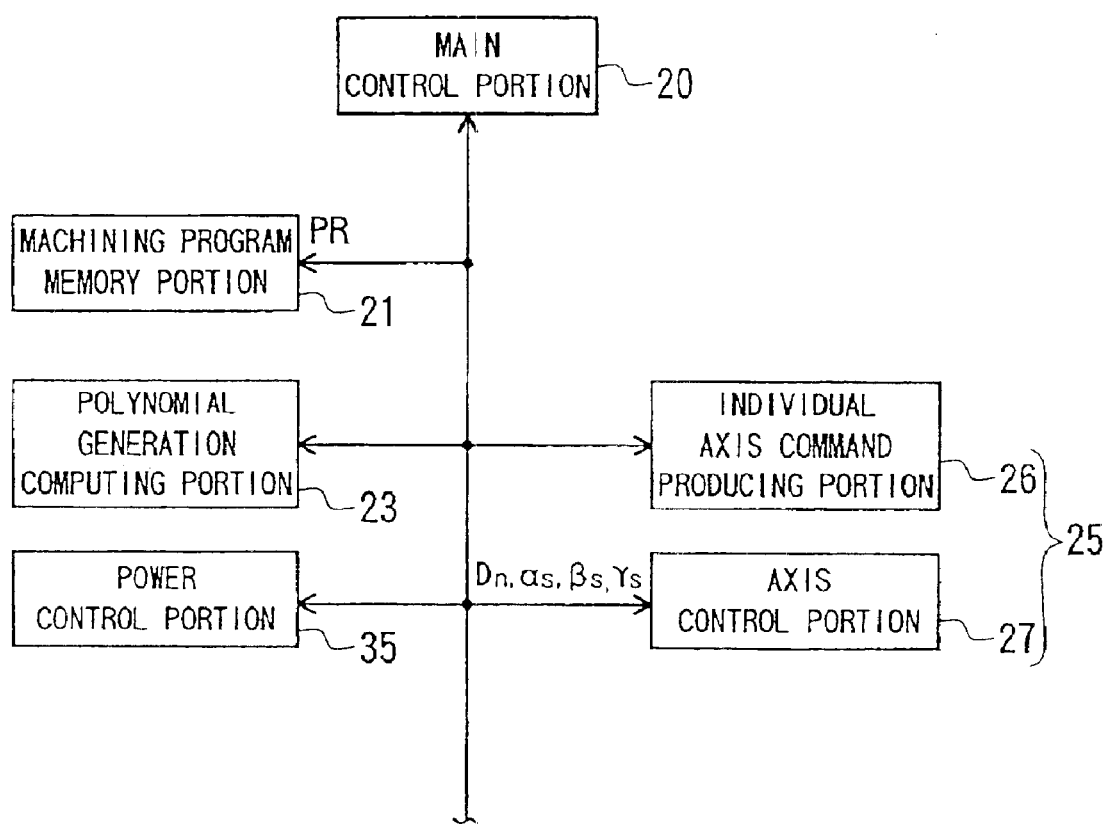
FIG. 1 is a block diagram showing a structure for control of a laser beam machine in the present embodiment.

Embodiments of the present invention will now be explained hereinafter, referring to drawings.

FIG. 3 shows a laser beam machine of the present embodiment. The laser beam machine 1 can have a base 2, with a table 3 provided on the base 2 being free to move and be driven in a horizontal X axis direction, as shown in FIG. 3. On the table 3, a workpiece W can be positioned for machining. A column 5 is provided on the base 2, bridging over the table 3, and having a saddle 6 that is free to move and be driven in a horizontal Y axis direction (the direction orthogonal to the X axis direction).

The saddle 6 has a head unit 7, which is free to move and be driven along the Z axis. Referring to FIG. 3(b), the head unit 7 is comprised of a first portion 7a on the saddle 6 side, a second portion 7b, being free to rotate and be driven along an axis "A" with respect to the first portion 7a, and having an axial center CT1 of the first portion 7a parallel to the Z-axis. A third portion 7c is free to rotate and drive along the B axis with respect to the second portion 7b and has a horizontal axial center CT2. A torch 7d is provided on the top end side of the third portion 7c, as shown in FIG. 3b. Further, a laser beam generating means (not shown) is provided which operates to emit a laser beam from the torch 7d to cut the workpiece W.

As mentioned before, the laser beam machine 1 performs three dimensional machining on the workpiece W in such a manner that relative positional relation between the workpiece W located on the table 3 and the top end of the torch 7d is three-dimensionally movable. Specifically, the machine operable to drive and position the table 3 in the X axis direction, the saddle 6 in the Y axis direction, the head unit 7 in the Z axis direction and the torch 7d in the A axis direction and the B axis direction, while the laser beam is emitted from the torch 7d.

FIG. 1 is a block diagram for showing a structure of control of the laser beam machine in the present embodiment. The laser beam machine 1 has a main control portion 20, as shown in FIG. 1. The main control portion 20 has a machining program memory portion 21, a polynomial generation computing portion 23, an individual axis command producing portion 26, an axis control portion 27, a power control portion 35 and the like. A servo control 25 is comprised of the individual axis command producing portion 26 and the axis control portion 27.

The laser beam machine 1 is comprised as mentioned before. Machining on the workpiece W with the laser beam machine 1 is executed as follows. In advance, a worker composes machining program PR (in this case, this machining program PR may be composed with a CAD and a CAM). The machining program PR is stored in the machining program memory portion 21 of the laser beam machine 1, as shown in FIG. 1.

Thereafter, when a worker inputs a command to the machine 1 to begin machining, the main control portion 20 reads the machining program PR stored in the machining program memory portion 21, and the polynomial generation computing portion 23 produces a time parameter type polynomial P(t) on the basis of a spatial position command PC for commanding moving position of the torch with respect to the workpiece W, and a velocity command VC which is the moving velocity at the time shown in the machining program PR. Thus, the time parameter type polynomial P(t) is generated on the basis of the relative moving locus of the laser cutting tool. Based on the time parameter polynomial P(t), the individual axis command producing portion 26 produces commands, such as position command D1, velocity command $\alpha_s$, acceleration command $\beta_s$ and jerk command $\gamma_s$ for moving the torch 7d with respect to the workpiece W on the table 3 so as to output to the axis control portion 27 of each axis.

Figure 2:
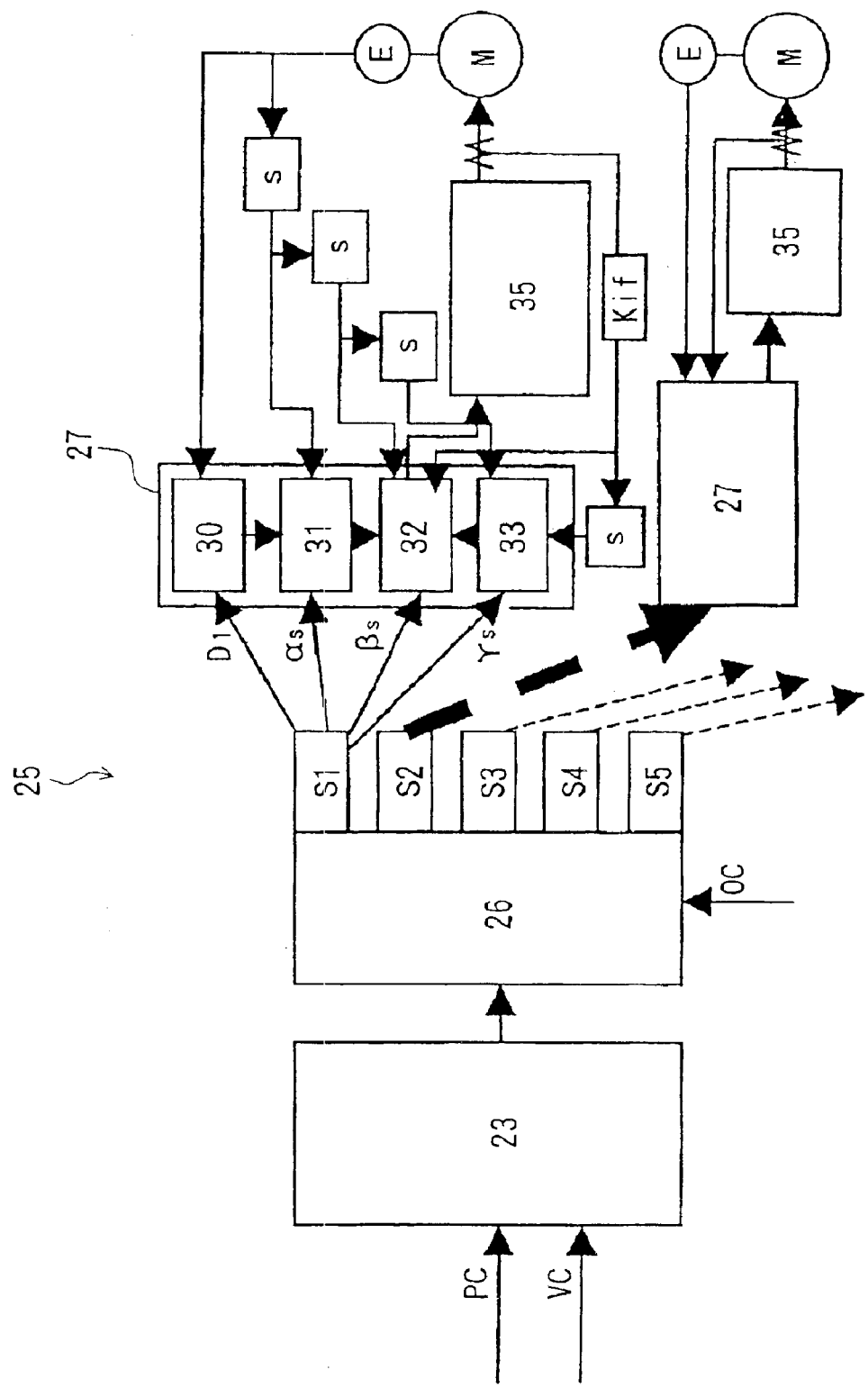
FIG. 2 is a block diagram showing a servo control system.

Referring to FIG. 2, a servo control system is shown for controlling motion along axes S1, S2, S3, S4, S5 respectively correspond to X axis, Y axis, Z axis, A axis and B axis.

Figure 4:
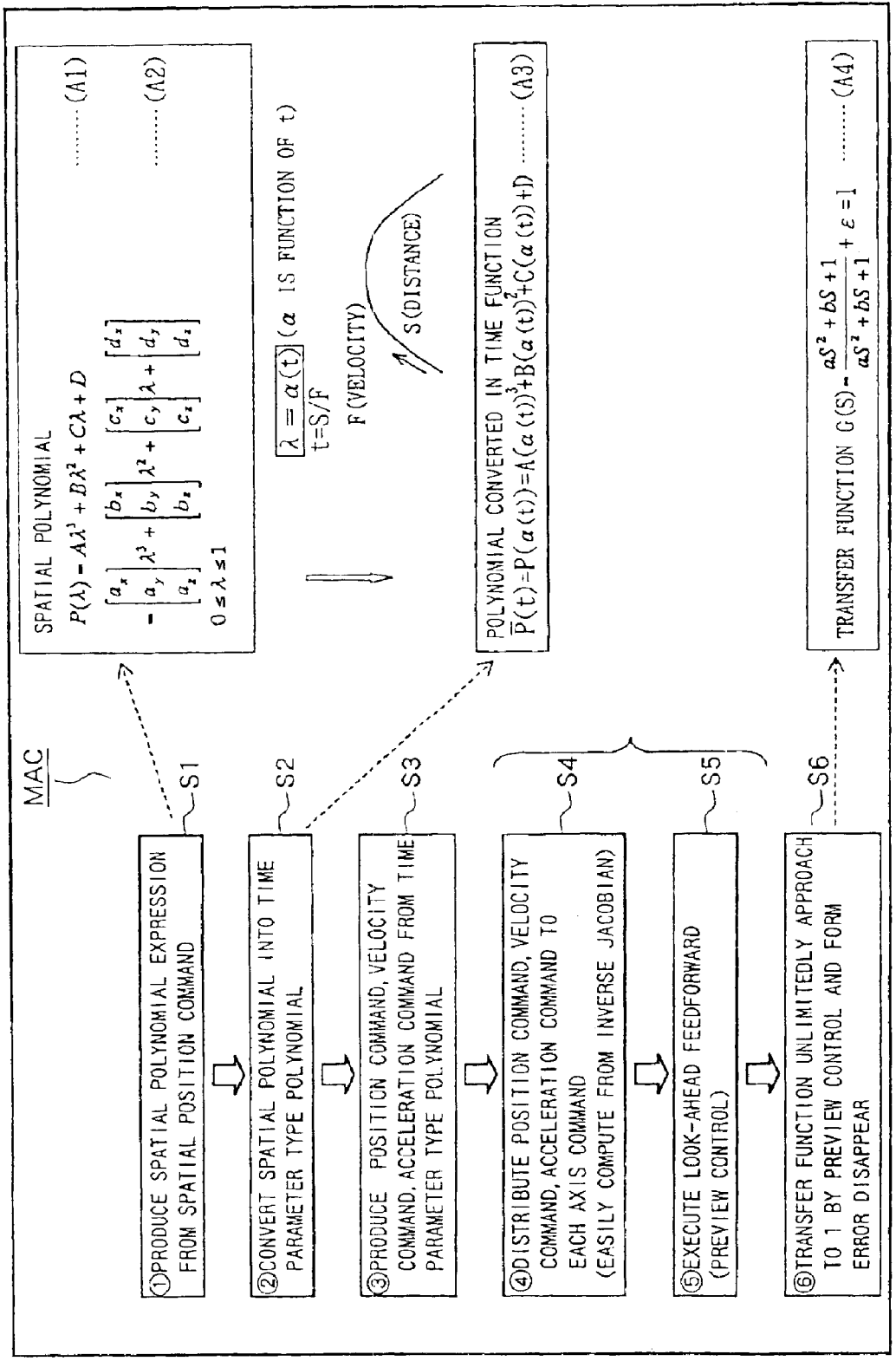
FIG. 4 is a flowchart for showing an example of a multiaxis control program (algorithm)

As previously noted, the polynomial generation computing portion 23 produces a spatial polynomial that approximates the tool movement locus in space using the spatial position command PC (for commanding relative moving position of the torch with respect to the workpiece), and the velocity command VC (which is the moving velocity), both of which are shown in the machining program PR. This is shown in step S1 of multiaxis control program MAC of FIG. 4. This makes use of such a known property that a curved line (or a straight line) in a space can be approximated by a polynomial, such as spline function or NURBS function after dividing into a plurality of line elements, as shown in FIG. 4. The following vector operation expression is obtained, for instance, as shown in expression (A1) of FIG. 4. That is, $$P(\lambda)=A\lambda^3+B\lambda^2+C\lambda+D \quad (A1).$$

By this polynomial, a straight line, an arc or the like can be correctly expressed in addition to a spline curved line. If there are three axes to be controlled, that is, X, Y, and Z, for instance, the expression (A1) can be developed as shown in an expression (A2) of FIG. 4.

Then, the multiaxis control program MAC performs step S2, in which the spatial polynomial P($\lambda$) is expressed as function of time t. This is done by setting $\lambda=\alpha(t)$, where $\alpha$ is function of t, and t equals moving distance divided by feeding velocity.

Thus, by basing the coefficient $\lambda$ on a specific desired value for tool velocity (feeding velocity) for all points of movement of the tool, the movement of the tool relative to the workpiece (using discrete servo commands) can be controlled so that the tool moves according to that desired velocity. A typical tool velocity profile is shown in the graph (C1) of FIG. 8, in which F(t) is feeding velocity, "t" is time, and "$\Delta$t" represents servo cycle time or sampling time. The value "k" represents a passing time from time =0 in graph (C1). The sampling time "$\Delta$t" is a fixed value in the servo control, and can be 1 millisecond. Substituting this into expression (B4) yields expression (C3), in which $\lambda_k$ is related to movement distance $l_k$. At the same time, the distance $l_k$ is also expressed by expression (C2) as a function of feed speed F(i) and the sampling time $\Delta$t. Substituting the coordinate equations for x and y from expression (B1) into this equation yields expression (C4). Assuming $\lambda_0=0$ results in expression (C5), and further assuming that $\lambda_1^3$ and $\lambda_1^2=0$ results in expression (C6). Rearranging expression (C6) provides in $\lambda_1$ as a function of "l," as shown in (C7). Generalizing this for increments of $l_k-l_{k-1}$ yields expression (C8), which provides $\lambda_k$ as a function of "$l_k$," thus providing a value of $\lambda$ for each incremental servo cycle time "$\Delta t$". Since "$l_k$" is known from expression (C2), provided for each sampling cycle "$\Delta t$," then $\lambda$ is thus a function of time, and can be entered into the spatial polynomial $P(\lambda)$ to obtain the time parameter type polynomial $P(t)$.

Then, the tool locus instructed by the machining program PR is expressed by the time function $P(t)$ which is the expression (A3). Thereafter, an expression for representing a tool position can be obtained from the time parameter type polynomial (A3), an expression for showing tool velocity is obtained by differentiating the polynomial (A3), an expression for showing tool acceleration is obtained by differentiating the expression for showing the velocity, and furthermore, an expression for showing jerk is obtained by differentiating the expression for showing the acceleration in step S3 of the multiaxis control program MAC. These expressions are output to the individual axis command producing portion 26, and the individual axis command producing portion 26 can immediately obtain the position, the velocity, the acceleration and the jerk in objective sampling time without time delay by substituting a predetermined sampling time in the expression.

That is, the velocity, the acceleration and the jerk of the top end of the torch at any time can be easily obtained without the previously discussed delay by differentiating the time parameter type polynomial $P(t)$. Once obtained, the expressions for position, velocity, acceleration and jerk of the top end of the torch are distributed to each control axis using inverse kinematics and inverse Jacobian or the like at step S4 of the multiaxis control program MAC to obtain the expressions showing the velocity, the acceleration and the jerk concerning each control axis.

The individual axis command producing portion 26 obtains the velocity, acceleration and jerk in each axis at a specific time at step S5 of the multiaxis control program MAC so as to output the position command Dn, velocity command $\alpha$, acceleration command $\beta$ (or power command) and jerk command $\gamma$ to the axis control portion 27. Since the velocity, the acceleration and the jerk at this specifiec time in future can be obtained in advance, preview control is provided by the axis control portion 27 for each axis in advance of each sampling time in future. As a result, appropriate tool control with no time delay is achieved. Therefore, the transfer function G(S) (A4) approaches 1 as shown in step S6 and the expression (A4), and correct machining without shape error is achieved. It is also possible to provide a velocity override command OC to the individual axis command producing portion 26.

The axis control portion 27 of each axis Sn thereafter executes servo control in each axis through the power control portion 35, which controls the electric power supplied to the motor M associated with each axis Sn. This control is achieved using the received position command Dn, the velocity command $\alpha$, the acceleration command $\beta$ (or power command) and the jerk command $\gamma$ in such a manner that position control on the basis of the position command Dn is performed by a position loop 30, velocity control on the basis of the velocity command $\alpha_s$ is performed by a velocity loop 31, acceleration control on the basis of the acceleration command $\beta_s$, is performed by an acceleration loop 32, and jerk control on the basis of the jerk command $\gamma$ is performed by a jerk loop 33. The sum of these commands results in movement of servo motor M to change the position of the torch in the direction of the associated axis by a predetermined amount for each sampling increment.

As mentioned before, the relative positional relation between the top end of the torch 7d of the laser beam machine 1 and the workpiece W is three-dimensionally adjustable by performing axis servo control in each axis Sn, to move the top end of the torch 7d in a space at a constant velocity. The workpiece W is three-dimensionally machined according to the above-mentioned machining program PR by a laser beam emitted from the torch 7d. The polynomial which approximates the tool movement locus is expressed as a function of time, and the position, velocity, acceleration and jerk of the torch 7d at a specific time in the future are computed in advance and are thus commanded. As a result, machining irregularity due to sudden changes in torch velocity and/or direction can be minimized, and accurate machining is achieved by the torch which is controlled on the basis of the polynomial.

Since the movement of the torch along the machining path is approximated by a polynomial that itself is a function of time, position shift (which is a problem in systems that control the position, velocity and acceleration of the cutting tool based on device feedback, as previously described) does not occur. Rather, the only error in this process is minor error due to the approximation inherent in the generation of the spatial polynomial. This error can be accounted for by providing a highly refined polynomial, thus making it easy to control accuracy.

Figure 6:
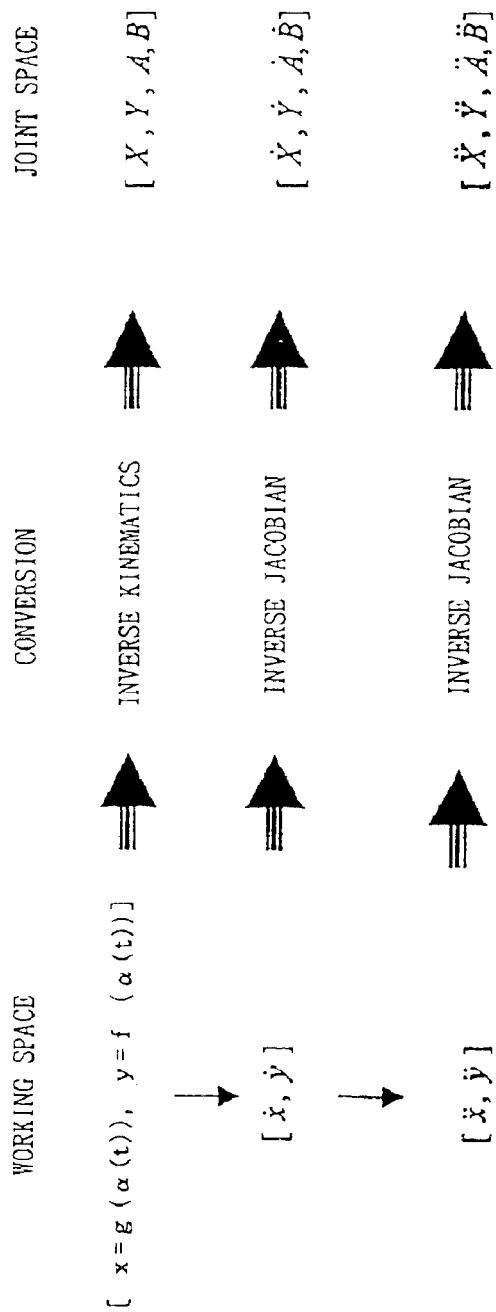
FIG. 6 shows the process steps for producing a command for each control axis representing a curved line in a two dimensional plane.
Figure 7:
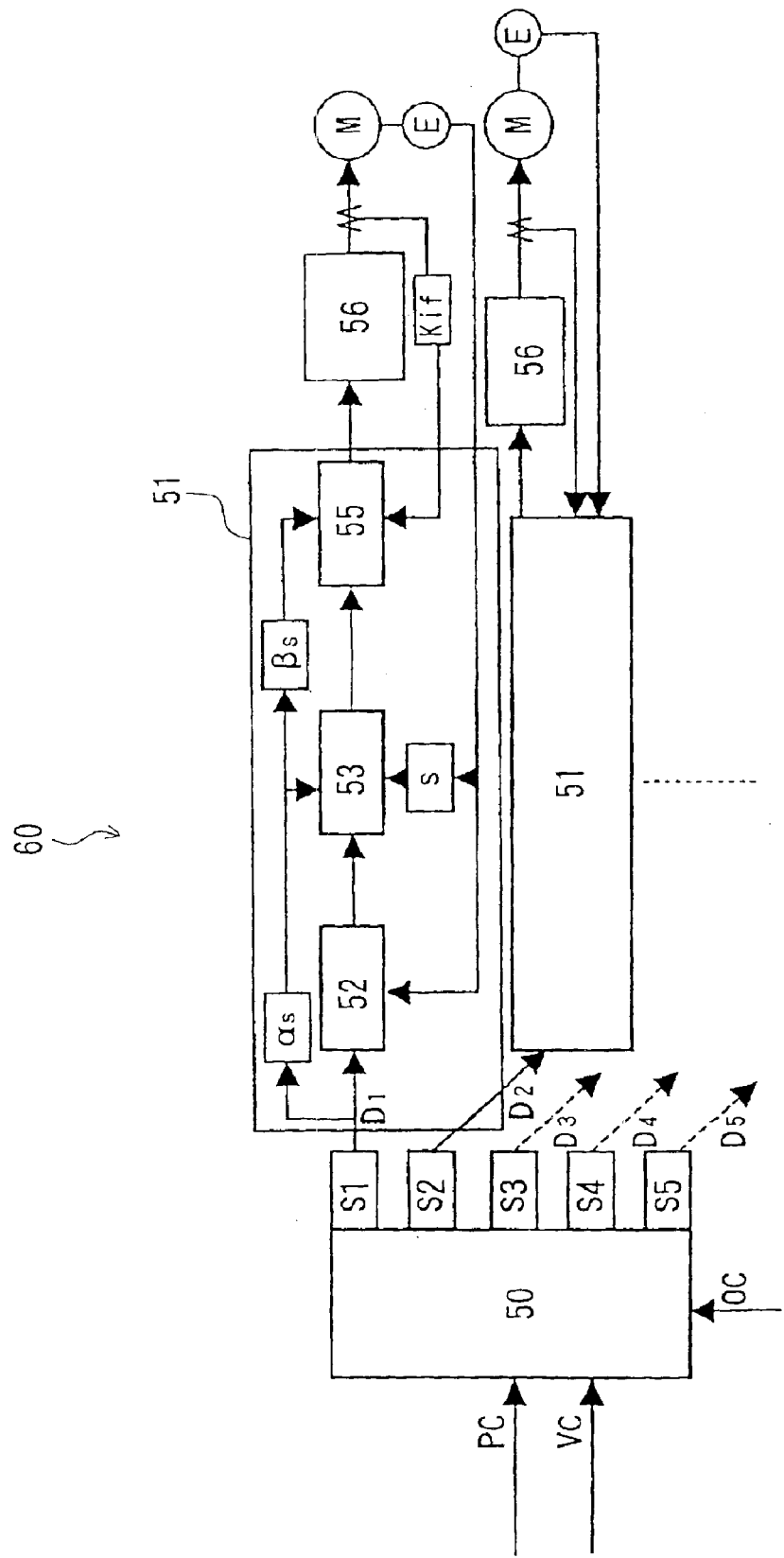
FIG. 7 is a block diagram showing a conventional servo control system.

An example wherein the present invention is applied to the control of tool path movement (i.e. torch movement) in a two dimensional plane is shown in FIGS. 5 and 6. A curved line LIN of X-Y plane can be used to approximate a desired tool locus (see FIG. 5). The curved line LIN is divided into a plurality of line elements $L_i$ defined between, and connecting, adjacent path points Pn−1, Pn, Pn+1. . . Thus, the curved line is defined by a spatial polynomial expression as shown in expressions (B1) and (B2).

If the total length of this curved line is L, the whole length L can be expressed by expression (B3), and the line elements $\Delta Li$ comprising the curved line LIN can be defined by expression (B4). By applying a velocity profile in the form of velocity function F(t) (expression (B5)) which itself is a function of time), to the curved line LIN as shown in expression (B4) and setting expressions (B4) and (B5) equal to each other, an expression (B6) is obtained in which the parameter $\lambda$ is solved as a function of time. In this manner, $\lambda$ and time t are related.

Substituting this relation in expressions (B1) and (B2) as shown in FIG. 6, the time parameter polynomial can be obtained. Using this time parameter polynomial, commands are distributed to each axis on the basis of steps S3 and S4 (see FIG. 4) of the multiaxis control program MAC, and control of each axis is executed as previously described.

This method is particularly advantageous because it allows the user to precisely control the speed of the cutting tool relative to the workpiece W to thereby minimize machining errors. For cutting operations performed using a laser, the relative speed (as well as the distance) between the workpiece W and the laser beam is normally maintained at a substantially constant value in order to ensure that the workpiece is cut to the desired dimensions within allowable tolerances or limits. If the speed is erratic, or is too fast or too slow, machining errors can result. Controlling this relative speed, however, can be difficult, and is especially true when the object to be machined has a complex shape, for example, where sharp or small-radius geometries exist. In such cases, if the control program simply instructs the tool to advance a certain distance along the cutting path in a discrete time interval, the tool head acceleration and/or jerk may change greatly (in one or more axes) when encountering such sharp or small-radius geometries. This can result in the tool making a cut in the piece that has a less than desired or needed precision or accuracy, which can result in material waste. With the present invention, cutting performance is optimized by controlling the machining process according to a polynomial (the motion function P(t)) that is approximated to maintain the speed of the tool substantially constant relative to the workpiece. This is done by calculating parameter $\lambda$ using the velocity function F(t) (also known as the "feeding speed"). The feeding speed F(t) can be set as a substantially constant value over the entirety of the cutting path (curved line LIN), and thus the value of parameter $\lambda$ can be calculated therefrom (as in FIG. 5). This value of $\lambda$, based on time and the substantially constant feed speed, is then substituted into the spatial polynomial to obtain the motion function (time parameter polynomial P(t)) for the tool that ensures that the speed of the tool in relation to the workpiece W will remain substantially constant throughout the cutting process.

Use of the time parameter polynomial P(t) to control the movement speed, and thus to provide a substantially constant feed speed, eliminates problems faced by prior devices which simply move the tool between successive discrete path points. The problem in controlling movement using the prior devices is that it can result in significant unevenness in movement speed if the distance between successive path points is not kept constant. This is of particular concern where the object is three dimensional and can have sharp edges or corners, where it can be difficult to control such inconstancies between successive path point distances. In such cases, with prior devices, it is possible that the tool will undergo substantial changes in speed, which, as previously noted, can result in machining errors and waste.

The present invention eliminates the possibility that the tool will undergo such substantial changes in speed, with attendant high acceleration and jerk, when machining complex shapes, thus minimizing errors in machining that can exceed tolerances and cause waste. The movement distance between the tool and the workpiece is instead precisely controlled to be constant for each line element $\Delta Li$ to thereby provide a known cutting movement per unit time. The previously described embodiment refers to the case of controlling the laser beam machine numerically controlled machine according to the present invention. It will be appreciated, however, that the present invention can be applied to control units for moving and controlling an object to be controlled with axis control in addition to the control of the laser beam machine. Furthermore, four control axes or less, and six control axes or more can be also controlled in addition to five axes control describe herein.

The embodiments which are described in the present specification are illustrative and non-limiting. The scope of the invention is designated by the accompanying claims and is not restricted by the descriptions of the specific embodiments. Accordingly, all the transformations and changes belonging to the claims are included in the scope of the present invention.

What is claimed is:

1. A numerically controlled method for moving an object to be controlled along a predetermined locus by controlling respective control axes in a joint space, the method comprising:

approximating said locus by defining a spatial polynomial in a work space, said spatial polynomial having a parameter $\lambda (0 \leq \lambda \leq 1)$;

obtaining said parameter $\lambda$ as a function of said time parameter t supposing that a length $\Delta L_i$ of one of the line elements of a curved line defined by said spatial polynomial is equal to a movement distance of moving said object to be controlled within a time $\Delta t_i$ on the basis of a predetermined speed function F(t) having a parameter of time t, by dividing said parameter $\lambda$ by sequences of numbers $0=\lambda_0<\lambda_1<\lambda_2<\lambda_3<\ldots<\lambda_i<\ldots<\lambda_n=1$;

producing said time parameter polynomial by entering $\lambda=\alpha(t)$ thus obtained into said spatial polynomial and converting said parameter $\lambda$ into said function of time parameter t;

producing a position command, a velocity command and an acceleration command from said converted time parameter polynomial;

converting and delivering said produced position command, said velocity command and said acceleration command to said respective control axes in said joint space;

producing control commands for said respective control axes in said joint space from said position command, said velocity command, and said acceleration command on the basis of said time parameter polynomial, converted and distributed to said control axes in said joint space; and moving said object to be controlled along said locus, while controlling said respective control axes in said joint space on the basis of said control commands.

2. The numerically controlled method according to claim 1, wherein said control command is produced partly on the basis of said position command on displacement at a given time from said time parameter polynomial, said velocity command obtained from a first derivative of said time parameter polynomial, and said acceleration command obtained from a second derivative of said time parameter polynomial.

3. The numerically controlled method according to claim 1, wherein said control command includes computing a position and velocity at a time in the future, wherein when said control command is executed, said object to be controlled has not yet moved on the basis of said time parameter polynomial, and instructing said position and said velocity.

4. The numerically controlled method according to claim 1, wherein said predetermined speed function F(t) is selected to result in movement along substantially the entire predetermined locus at a substantially constant velocity.

5. A method for controlling the movement of an object along a predetermined locus in space by controlling respective machine control axes, the method comprising:

approximating said locus by defining a spatial polynomial in a work space, said spatial polynomial having a coefficient $\lambda$;

obtaining said parameter $\lambda$ as a function of time t by assuming that a length $\Delta L_i$ of one of the line elements of a curved line defined by said spatial polynomial is equal to a movement distance of said object over a time $\Delta t_i$ on the basis of a predetermined speed function F(t), which is a function of time t, by dividing said parameter $\lambda$ by sequences of numbers $0=\lambda_0<\lambda_1<\lambda_2<\lambda_3<\ldots<\lambda_i<\ldots<\lambda_n=1$;

converting the spatial polynomial into a time parameter polynomial by substituting $\lambda=\alpha(t)$ into said spatial polynomial and converting said parameter λ into said function of time parameter t;

producing a position command, a velocity command and an acceleration command from said time parameter polynomial;

converting and delivering said produced position command, said velocity command and said acceleration command to said respective control axes in said joint space;

producing control commands for said respective control axes from said position command, said velocity command, and said acceleration command on the basis of said time parameter polynomial; and moving said object to be controlled along said locus, while controlling said respective control axes in said space on the basis of said control commands.

6. The method for controlling the movement of an object according to claim 5, wherein said control command is produced partly on the basis of said position command obtained from said time parameter polynomial at a given time, said velocity command is obtained from a first derivative of said time parameter polynomial, and said acceleration command obtained from a second derivative of said time parameter polynomial.

7. The method for controlling the movement of an object according to claim 6, wherein said control command includes computing a position and velocity at a desired time in the future.

8. The method for controlling the movement of an object according to claim 7, wherein when said control command is executed, said object to be controlled has not yet moved on the basis of said time parameter polynomial.

9. The method for controlling the movement of an object according to claim 8, wherein the step of moving said object to be controlled along said locus comprises moving the object at a substantially constant speed.

10. A method for controlling the movement of an object in space, the method comprising:

defining a predetermined locus in space for movement of the object;

approximating said locus by defining a spatial polynomial in a work space, said spatial polynomial having a coefficient λ;

relating the coefficient λ to time by assuming that a length $\Delta L_i$ of one of the line elements of a curved line defined by said spatial polynomial is equal to a movement distance of said object over a time $\Delta t_i$, on the basis of a predetermined speed function F(t) which is a function of time t, by dividing said parameter λ by sequences of numbers $0 = \lambda_0 < \lambda_1 < \lambda_2 < \lambda_3 < \ldots < \lambda_i < \ldots < \lambda_n = 1$;

converting the spatial polynomial into a time parameter polynomial by substituting $\lambda = \alpha(t)$ into said spatial polynomial and substituting said parameter λ into said function of time parameter t;

providing a control command from said spatial polynomial, comprising a position command, a velocity command and an acceleration command to said respective control axes in said joint space;

moving said object to be controlled along said locus on the basis of said control command.

11. The method of claim 10, wherein the speed function is selected to produce the velocity command for moving the object along a substantial portion of the locus at a substantially constant velocity.

12. The method of claim 11, wherein the speed function is related to three mutually orthogonal axes to provide said substantially constant velocity in said working space.

13. The method of claim 12, further comprising controlling said position command, said velocity command and said acceleration command to limit the movement of the object to predetermined maximum values of acceleration and jerk.

* * * * *